(12) United States Patent
Tan et al.

(10) Patent No.: US 8,972,234 B2
(45) Date of Patent: Mar. 3, 2015

(54) METHOD AND SYSTEM TO REDUCE: MEMORY REQUIREMENTS, DEVICE-TO-HOST TRANSFER BANDWIDTH REQUIREMENTS, AND SETUP TIME, FOR SEISMIC MODELING ON GRAPHICS PROCESSING UNITS

(75) Inventors: Lijian Tan, Houston, TX (US); Mingqiu Luo, Houston, TX (US)

(73) Assignee: Advanced Geophysical Technology Inc., Houston, TX (US)

(*) Notice: Subject to any disclaimer, the term of this patent is extended or adjusted under 35 U.S.C. 154(b) by 272 days.

(21) Appl. No.: 13/367,189

(22) Filed: Feb. 6, 2012

(65) Prior Publication Data

US 2012/0203523 A1 Aug. 9, 2012

Related U.S. Application Data

(60) Provisional application No. 61/440,979, filed on Feb. 9, 2011.

(51) Int. Cl.
G06G 7/48 (2006.01)
G01V 1/28 (2006.01)
G06F 9/50 (2006.01)
G06T 1/20 (2006.01)
G09G 5/36 (2006.01)
G06T 15/00 (2011.01)

(52) U.S. Cl.
CPC ............ *G01V 1/28* (2013.01); *G06F 9/5044* (2013.01); *G06T 1/20* (2013.01); *G09G 5/363* (2013.01); *G06T 15/005* (2013.01)
USPC .......................................................... 703/10

(58) Field of Classification Search
USPC .......................................................... 703/10
See application file for complete search history.

(56) References Cited

PUBLICATIONS

Walsh et al.: Accelerating geoscience and engineering system simulations on graphics hardware; Computers & Geosciences 35 (2009) 2353-2364.*
Dimitri Komatitsch, Gordon Erlebacher, "Modeling the Propagation of Elastic Waves Using Spectral Elements on a Cluster of 192 GPUs," Computer Sci. Res. Dev. 2010, 75-82.
Dimitri Komatitsch, Gordon Erlebacher, Dorainik Goddeke, David Michea, "High Order Finite-Element Seismic Wave Propagation Modeling with MPI on a Large GPU Cluster," Journal of Computational Physics, Jun. 24, 2010, pp. 7692-7714
Geohys. David Michea and Dimitri Komatitsch "Accelerating a 3D Finite-Difference Wave Propagation Code Using GPU Graphics Cards," J. Int.(2010) 182, 389-402.
R. Abdelkhalek, H. Calandra, O. Coulaud, G. Latu, J. Roman, "Fast Seismic Modeling and Reverse Time Migration on a GPU Cluster," the 2009 High Performance Computing & Simulation—HPCS 09 (2009); and, pp.36-43.

* cited by examiner

*Primary Examiner* — Hugh Jones

(57) ABSTRACT

A method for seismic modeling on a GPU includes creating a discretized model containing a volume enclosed by boundaries with arbitrary boundary conditions, dividing the discretized model into subsets, transferring a data to the GPU, initializing the data stored in a selected number of the subsets on the GPU, performing computation related with a number of time steps for the selected number of the subsets on the GPU, and substantially simultaneously computing, off-loading a finished subsets data from the GPU, and up-loading a new subsets data to the GPU. The provided method and corresponding system can reduce the amount of data stored in GPU memory by an order of magnitude, minimize the GPU device-to-host transfer bandwidth requirements, and reduce the GPU setup time.

16 Claims, 4 Drawing Sheets

METHOD AND SYSTEM TO REDUCE: MEMORY REQUIREMENTS, DEVICE-TO-HOST TRANSFER BANDWIDTH REQUIREMENTS, AND SETUP TIME, FOR SEISMIC MODELING ON GRAPHICS PROCESSING UNITS

CROSS-REFERENCE TO RELATED APPLICATION(S)

The present invention claims the benefits of the filing date of U.S. Provisional Patent Application Ser. No. 61/440, 979, filed on February 2011, the disclosure of which is hereby incorporated by reference in its entirety.

FIELD OF THE INVENTION

The present invention generally relates to a method and a system for processing seismic data on a Graphics Processing Unit (GPU). More specifically, the present invention allows for significant reduction of: required GPU memory, GPU device-to-host transfer bandwidth, and GPU setup time.

BACKGROUND OF THE INVENTION

Seismic exploration techniques are used by the oil and gas industry in exploration to identify prospects and types of geologic formations. After seismic acquisition, seismic processing is a step for generating sub-surface images for interpretation. Depth migration is a method of seismic processing.

Seismic wave propagation is one of the components to depth migration. Traditionally, approximations of the wave equation, for example ray tracing and one-way approximation, can be used to reduce high computation cost. Full-wave modeling of seismic wave propagation becomes more practical due to advances in computer hardware technology.

The Graphics Processing Unit (GPU) can be used to off-load graphics computations from the Central Processing Unit (CPU). The theoretical peak performance, that is, floating point operations, of a GPU can be orders of magnitude faster than that of the latest CPU, and the memory bandwidth of a GPU can be orders of magnitude larger than that of CPU. Furthermore, a GPU can require only approximately $\frac{1}{10}$ of the energy consumed by a CPU cluster with similar processing capability.

To take the advantage of a GPU, special coding can be required. Compute Unified Device Architecture (CUDA) and Open Computing Language (OpenCL) are two programming language choices for coding. They can be built into traditional C/C++ code. However, the coding strategy and implementation on the GPU can be completely different from that of the CPU. Significantly different algorithm design can be necessary to take the full advantage of high performance GPU. The actual benefit provided by a GPU can depend on the application and the coding strategy.

Significant research efforts in seismic processing industry are conducted in recent years. See, e.g., David Michea and Dimitri Komatitsch "Accelerating a 3D Finite-Difference Wave Propagation Code Using GPU Graphics Cards," Geohys. J. Int. (2010) 182, 389-402; Dimitri Komatitsch, Gordon Erlebacher, Dominik Goddeke, David Michea, "High Order Finite-Element Seismic Wave Propagation Modeling with MPI on a Large GPU Cluster," Journal of Computational Physics, 229 (2010) 7692-7714; R. Abdelkhalek, H. Calandra, O. Coulaud, G. Latu, J. Roman, "Fast Seismic Modeling and Reverse Time Migration on a GPU Cluster," the 2009 High Performance Computing & Simulation—HPCS 09 (2009); and Dimitri Komatitsch, Gordon Erlebacher, "Modeling the Propagation of Elastic Waves Using Spectral Elements on a Cluster of 192 GPUs," Computer Sci. Res. Dev. 2010 25: 75-82.

However, even with the significant research efforts on GPU seismic modeling, a GPU's limited memory and slow transfer rate between GPU and CPU can remain a significant challenge for application of GPU seismic modeling to industry scale problems that involve complex physics.

Some researches for addressing these challenges are to push the limit of GPU device memory size, and to utilize high-end network connections.

The other researches have focused on GPU parallel computing. Data is uploaded to a GPU at the beginning stage and result data is offloaded from the GPU after computation. During computation on the GPU, data transfer between CPU and GPU is kept to a minimum, mainly for the purpose of exchanging domain boundary results, which is necessary for domain decomposition algorithms.

As described above, a need exists for performing accurate seismic modeling on Graphics Processing Unit (GPU) devices that minimize GPU device memory requirements.

A further need exists for performing accurate seismic modeling on GPU devices that minimize GPU device-to-host transfer bandwidth requirements.

A further need exists for performing accurate seismic modeling on GPU devices that minimizes time spent on setup.

The present embodiments of the method and the system meet these needs, and improve on the technology.

SUMMARY OF THE INVENTION

This section provides a general summary of the disclosure, and is not a comprehensive disclosure of its full scope or its entire feature.

A computer-implemented method for seismic modeling on a GPU can include creating a discretized model containing a volume enclosed by boundaries with arbitrary boundary conditions, dividing the discretized model into subsets which are allocated memory space on the GPU, transferring a data to the GPU, initializing the data stored in a selected number of the subsets on the GPU, performing computation related with a number of time steps for the selected number of the subsets on the GPU, and substantially simultaneously computing, off-loading a finished subsets data from the GPU, and up-loading a new subsets data to the GPU.

In some embodiments, the computer-implemented method further includes changing a subsets scan direction until all time levels are finished.

In some embodiments, the data stored in the selected number of the subsets on the GPU to be performed computation is relatively small to data stored on a CPU memory, a RAM, or a hard disk drive during the computation.

In still embodiments, the discretized model is divided into a structured shape of layers.

In still embodiments, the discretized model is divided into an irregular shape of sub-domains.

In other embodiments, the subset defines a data source selected from the group of earth model parameters, receiver locations, source locations, wavefield illumination results, and wavefield imaging results.

In other embodiments, performing computation further includes calculating a numerical finite-difference approximation to wave equations.

In other embodiments, performing computation further includes calculating a numerical finite-element approximation to wave equations.

In still other embodiments, performing computation further includes calculating a numerical approximation to isotropic wave equations.

In still other embodiments, performing computation further includes calculating a numerical approximation to anisotropic wave equations.

In another embodiment, performing computation further includes data compression.

In another embodiment, performing computation further includes applying cross-correlation for imaging.

In still another embodiment, performing computation further includes applying cross-correlation for gradient computation.

In still another embodiment, performing computation further includes propagating source wavefield.

In still another embodiment, performing computation further includes propagating receiver wavefield.

In still another embodiment, performing computation further includes substantially simultaneously propagating source wavefield and receiver wavefield.

In still another embodiment, the data offloaded from and up-loaded to the GPU is selected from the group of wavefield data, image results, and gradient results.

A system for seismic modeling includes a GPU memory configured to store a relatively small portion of a seismic data, at least one data storage configured to store a relatively large portion of the seismic data, and a GPU configured and arranged to perform a processing procedure including creating a discretized model containing a volume enclosed by boundaries with arbitrary boundary conditions, dividing the discretized model into subsets which are allocated space of the GPU memory, initializing the seismic data stored in a selected number of the subsets on the GPU, performing computation related with a number of time steps for the selected number of the subsets on the GPU, and substantially simultaneously computing, off-loading a finished subsets seismic data from the GPU memory to the data storage and up-loading a new subsets seismic data to the GPU memory.

In some embodiments, the processing procedure further comprising changing a subsets scan direction until all time levels are finished.

In other embodiments, the data storage is selected from the group of a CPU memory, a RAM, and a hard disk drive.

BRIEF DESCRIPTION OF THE DRAWINGS

The drawings described herein are for illustrating purposes only of selected embodiments and not all possible implementation and are not intended to limit the scope of the present disclosure.

The detailed description will be better understood in conjunction with the accompanying drawings as follows.

The present embodiments are detailed below with reference to the listed Figures.

DETAILED DESCRIPTION OF THE EMBODIMENTS

Before explaining the present invention in detail, it is to be understood that the method and the system are not limited to the particular embodiments and that they can be practiced or carried out in various ways.

The sequence of steps for a 3D seismic modeling in time domain typically includes initializing wavefield, loading earth model parameters, applying finite difference stencil according to governing equation, applying boundary condition, updating wavefield with source, recording wavefield data, looping through all time steps, and off-loading results.

The present embodiments according to the present invention provide a method and a system for performing accurate seismic modeling on GPU device by minimizing GPU device memory requirement and GPU device to host transfer bandwidth requirement. Thus, GPU device can be used to perform seismic modeling with desired frequency to increase the accuracy of seismic modeling. In addition, the present embodiments allow for the implementation of 3D finite-difference approximation for wave propagation in illumination analysis, reverse time migration, and waveform inversion.

In the present embodiments, a physical/computational domain can be divided into a number of subsets, such as layers in the depth direction. Earth model parameters, receiver locations, source locations, wavefield and other results, such as illumination results and imaging results, can be defined for each subset domain. Time evolution of results, such as wavefield, can be performed separately for each layer with a well designed sequence.

The current embodiments can perform computation and data transfer simultaneously. Because of the minimization of data transfer amount and continuous data transfer, the GPU device-to-host transfer, such as through Peripheral Component Interconnect (PCI) Express, bandwidth becomes sufficient for the amount of data.

The present embodiments can be described for wave propagation utilizing finite-difference approximation of the scalar acoustic wave equation, and also can be extended to the vector wave equations and TTI elastic equations as well. The current embodiments of the method and the system can be applied in both isotropic and anisotropic media.

Figure 1:
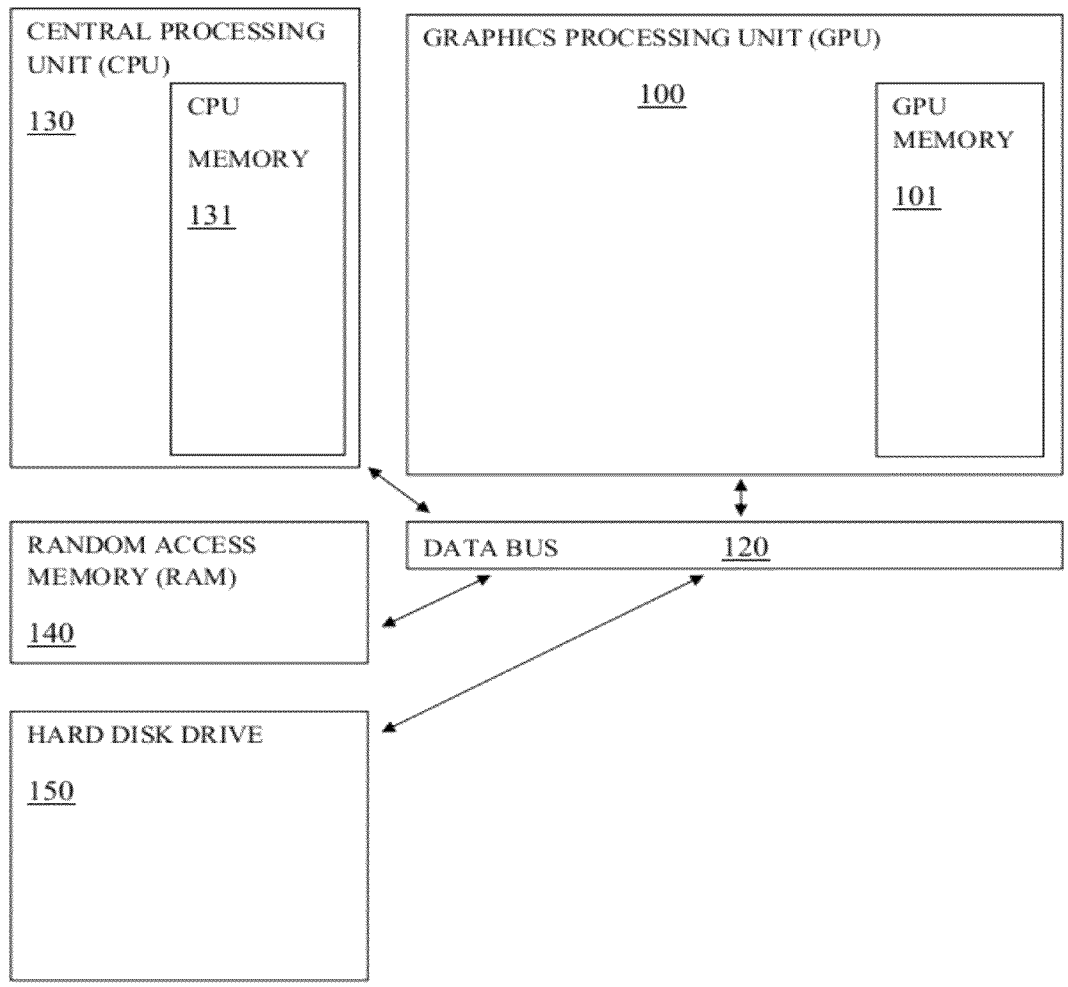
FIG. 1 is an illustration of a common computer configuration with a CPU, GPU, RAM, and Hard Disk Drive.

FIG. 1 shows an example of a computer containing a CPU 130 with CPU memory 131; a GPU 100 with GPU memory 101; random access memory (RAM) 140; and a Hard Disk Drive 150; all communicating through a Data Bus 120.

In the present embodiments only a relatively small portion of the data required for computation, such as wavefield, earth model, image, or gradient data, can be stored on GPU memory 101. The remaining data can be stored on more expensive, larger, and/or slower storage such as CPU memory 131 or a Hard Disk Drive 150. Data held in GPU memory 101 can be updated at different time levels instead of at one time level. Concurrently with the data update, data can be continuously off-loaded from GPU 100 for temporary storage, such as to CPU memory 131 or a Hard Disk Drive 150, for further handling by the CPU 130. At the same time, data can also be continuously up-loaded to GPU 100 for intensive computations. Inter-leaved direction looping can be applied to scan through data for removal or significant reduction of setup overhead.

Figure 2:
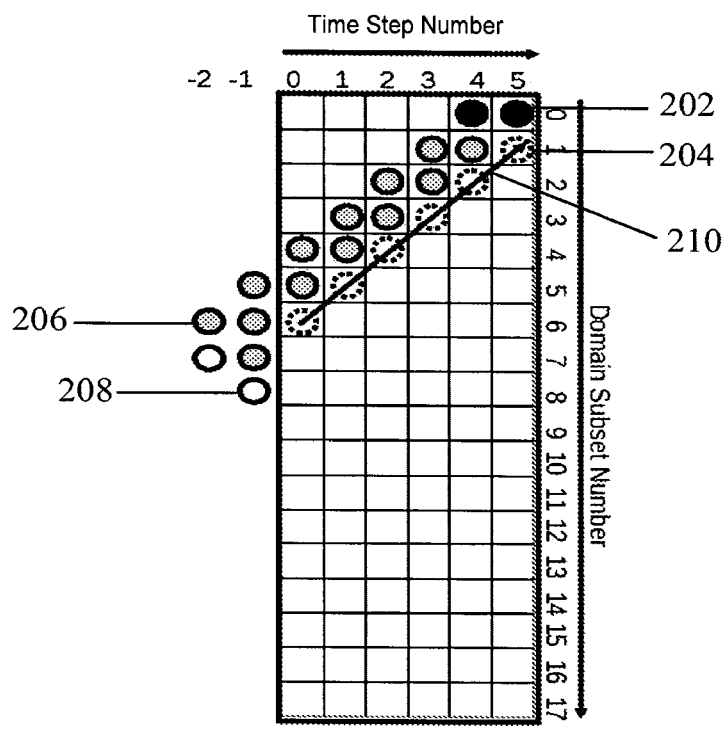
FIG. 2 illustrates a sequence of computation and an overlapping of computation and data transfer.

FIG. 2 shows an example of the sequence of computation and the overlapping of computation and data transfer. The arrow 210 represents the sequence of how neighboring domain subsets are updated at different time levels. The circles filled with gray color 206 represent data being read accessed for computing. After computing the updated values for the next time step for a given domain subset, the memory space for storing the previous time step result will be used to store the updated result, represented as the empty dashed circles 204.

As preparation for the next set of computations, data is loaded to the GPU device (100 in FIG. 1) for layers, represented by empty circles 208. To keep the GPU device memory (101 in FIG. 1) requirements the same, results, represented by black filled circles 202, can be off-loaded from the GPU device and stored in another slower but large device such as in RAM (140 in FIG. 1) or a Hard Disk Drive (150 in FIG. 1).

The data transfer (occurring through the Data Bus 120 of FIG. 1), including off-loading and up-loading, can be overlapped with computation. Therefore, with sufficient computations, the data transfer can be completely overlapped.

Figure 3:
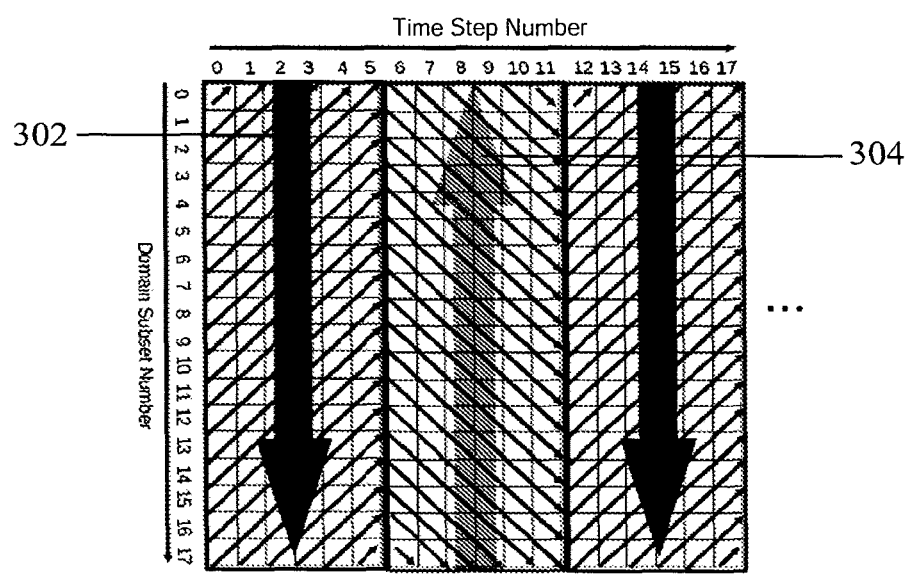
FIG. 3 is an illustration of the interleaved looping direction for minimizing GPU setup time.

FIG. 3 shows an example of reversing the main loop direction. After finishing a sweep of loops, data for another end of the domain is stored on device. To avoid the re-initialization process, including off-loading the stored data on the GPU device, and uploading new data, the main loop direction (represented by a bold black arrow 302) can be reversed. The grey arrow 304 shows the reversed loop direction. This interleaved loop direction can completely remove the need for GPU data set up.

Figure 4:
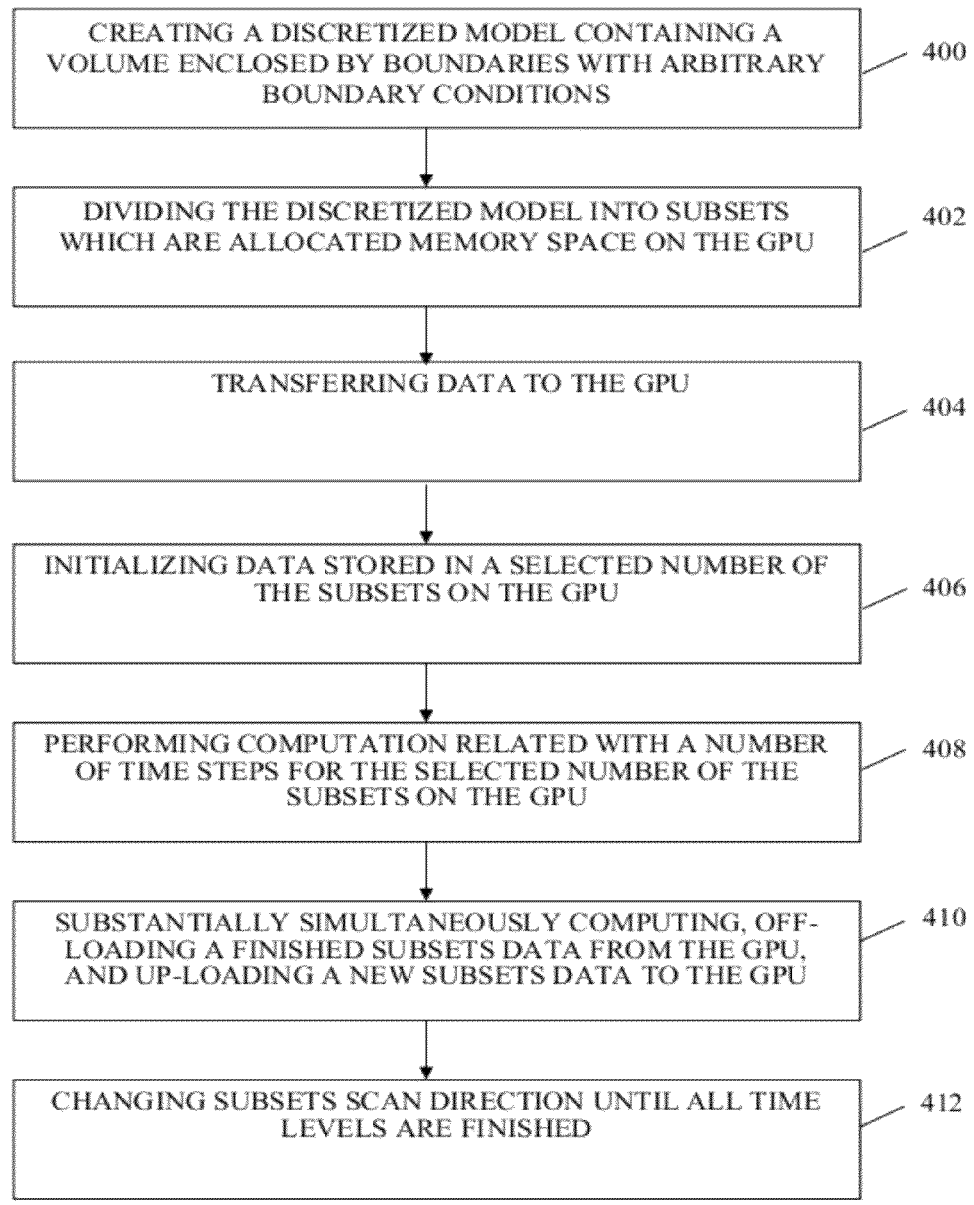
FIG. 4 is a flowchart of a method to reduce memory requirements, device-to-host transfer bandwidth requirements, and set up time, for seismic modeling on GPU.

FIG. 4 is a flowchart of a method to reduce memory requirements, device-to-host transfer bandwidth requirements, and set up time, for seismic modeling on GPU. The method can include steps of:

1. creating a discretized model containing a volume enclosed by boundaries with arbitrary boundary conditions 400;
2. dividing the discretized model into subsets which are allocated memory space on the GPU 402;
3. transferring data to the GPU 404;
4. initializing data stored in a selected number of subsets on the GPU 406;
5. performing computation related with a number of time steps for selected number of subsets on the GPU 408;
6. substantially simultaneously computing, off-loading finished subsets data from the GPU and up-loading new subsets data to the GPU 410; and/or
7. changing subsets scan direction until all time levels are finished 412.

In some embodiments, the discretized model can be divided into: a structured shape of layers and/or an irregular shape of sub-domains.

In some embodiments, the data stored in the selected number of the subsets on the GPU to be performed computation can be relatively small to the data stored on a CPU a RAM, or a Hard Disk Drive.

In some embodiments, the computations can include: calculating a numerical finite-difference approximation to wave equations, calculating a numerical finite-element approximation to wave equations, calculating a numerical approximation to isotropic wave equations, calculating a numerical approximation to anisotropic wave equations, data compression, applying cross-correlation for imaging, applying cross-correlation for gradient computation, propagating source wavefield, propagating receiver wavefield, and/or simultaneous propagating of source wavefield and receiver wavefield.

In some embodiments, the off-loading and up-loading data can include off-loading and up-loading of: wave-field data, image results, and/or gradient results.

Limited GPU memory and GPU-CPU transfer bandwidth can be a significant limitation of using GPU for seismic modeling such as when a large number of grid points are involved. The current embodiments can allow seismic modeling and reverse time migration to be performed in a single computing node.

The current embodiments can be orthogonal to a standard domain decomposition concept. Techniques such as multi-threading, for example POSIX Threads (pthread) and/or Open Multi-Processing (OpenMP); and multi-processing, such as Message Passing Interface (MPI), can be applied together with the present embodiments to solve problems with significant number of grid points and with any complex physics such as TTI elastic.

While these embodiments have been described with emphasis on the embodiments, it should be understood that within the scope of the method and the system, the embodiments might be practiced other than as specifically described herein. The current embodiments may be implemented using commodity high-performance GPU computing servers. More than a single GPU, CPU, host, etc may be used. Multiple GPU device-to-host paths can be utilized. Multiple models, waves, domains, processes, nodes, subsets, levels, equations, images, wavefields, data sets, and results can be applied to the method and the system.

What is claimed is:

1. A non-transitory, tangible, computer readable medium storing computer-readable instructions that, when executed by a processor perform a method for seismic modeling on a GPU having a GPU memory comprising:
   a. creating a discretized model;
   b. dividing the discretized model into a selected number of domain subsets, the domain subsets numbered from a first domain subset to a last domain subset;
   c. determining a selected number of time steps corresponding to a first time level, the time steps being numbered from a first time step to a last time step, the last time step corresponding to the final time step of the first time level;
   d. initializing data to the GPU memory;
   e. adding a data element corresponding to a higher numbered domain subset at an initial time step of the first time level to the GPU memory, the initial time step being the time step prior to the first time step of the first time level;
   f. calculating a result corresponding to the next lower numbered domain subset at the next later time step;
   g. repeating operation f until a result is calculated for the final time step of the first time level or until a result is calculated for the first domain subset;
   h. repeating operations e-g until the added data element corresponds with the last domain subset;
   i. repeating operations f-g until a result is calculated for the last domain subset for the final time step of the first time level.

2. The non-transitory, tangible, computer readable medium of claim 1, wherein the initializing operation comprises:
   j. adding a first data element corresponding to the first domain subset at the initial time step of the first time level to the GPU memory;
   k. adding a data element corresponding to the second domain subset at the initial time step of the first time level to the GPU memory;
   l. calculating a result corresponding to the first domain subset at the first time step of the first time level.

3. The non-transitory, tangible, computer readable medium of claim 1, wherein the initializing operation comprises:
   j. adding a data element corresponding to the initial time step of the first time level to the GPU memory for each of the domain subsets from the first domain subset to the domain subset having the same number as the selected number of time steps;
   k. calculating a result corresponding to the first domain subset at the first time step of the first time level;
   l. calculating a result corresponding to the next higher domain subset at the first time step of the first time level;
   m. calculating a result corresponding to the next lower numbered domain subset at the next later time step;
   n. repeating the m operation until a result is calculated for the first domain subset;
   o. repeating the l-n operations until a result is calculated for the first domain subset at the final time step of the first time level.

4. The non-transitory, tangible, computer readable medium of claim 1, wherein each data element and each result is stored at a GPU memory, and at least one result for a given domain subset is stored at a GPU memory space previously used to store a data element or result for the given domain subset at a previous time step.

5. The non-transitory, tangible, computer readable medium of claim 1, further comprising:
   j. offloading from the GPU memory a result for a given domain subset for the final time step of the first time level to a CPU, CPU memory, RAM, or hard disk.

6. The non-transitory, tangible, computer readable medium of claim 5, further comprising:
   k. offloading from the GPU memory a result for a given domain subset for the time step prior to the final time step of the first time level to the CPU, CPU memory, RAM, or hard disk.

7. The non-transitory, tangible, computer readable medium of claim 5, wherein the e and j operations are run substantially contemporaneously with the f-i operations.

8. The non-transitory, tangible, computer readable medium of claim 5, wherein the j operation further comprises:
   k. removing the offloaded result from the GPU memory.

9. The non-transitory, tangible, computer readable medium of claim 5, wherein the j operation further comprises:
   k. retaining offloaded result in the GPU memory if the offloaded result corresponds to a domain subset having a number within the selected number of time steps of the last domain subset.

10. The non-transitory, tangible, computer readable medium of claim 9, wherein the final time step of the first time level corresponds to an initial time step of a second time level, and the method further comprises:
   l. calculating a result corresponding to the last domain subset at the first time step of the second time level;
   m. calculating a result corresponding to the next lower domain subset at the first time step of the second time level;
   n. calculating a result corresponding to the next higher numbered domain subset at the next later time step;
   o. repeating the n operation until a result is calculated for the last domain subset;
   p. repeating the m-o operations until a result is calculated for the last domain subset at the final time step of the second time level;
   q. adding a data element corresponding to the next lower numbered domain subset at the initial time step of the second time level to the GPU memory, the data element being a previously calculated result for the given domain subset at the final time step of the first time level;
   r. calculating a result corresponding to the next higher numbered domain subset at the next later time step;
   s. repeating operation r until a result is calculated for the final time step of the second time level or until a result is calculated for the last domain subset;
   t. repeating operations q-s until the added data element corresponds with the first domain subset;
   u. repeating operations r-s until a result is calculated for the last domain subset for the final time step of the second time level.

11. The non-transitory, tangible, computer readable medium of claim 1, wherein the e operation comprises receiving the data element from a CPU, CPU memory, RAM, or a hard disk.

12. The non-transitory, tangible, computer readable medium of claim 1, wherein the e operation further comprises adding a second data element corresponding to the higher numbered domain subset at a second initial time step of the first time level to the GPU memory, the second initial time step being the time step prior to the first initial time step of the first time level.

13. The non-transitory, tangible, computer readable medium of claim 1, wherein the result calculated by the f operation for a given domain subset is calculated using one or more of a result or a data point for the given domain subset at an earlier time step, a result or a data point for an adjacent domain subset at an earlier time step, or a boundary condition.

14. The non-transitory, tangible, computer readable medium of claim 1, wherein the discretized model comprises a data source selected from the group of earth model parameters, receiver locations, source locations, wavefield illumination results, and wavefield imaging results.

15. The non-transitory, tangible, computer readable medium of claim 1, wherein the f operation comprises one or more of calculating a numerical finite-difference approximation to wave equations, calculating a numerical finite-element approximation to wave equations, calculating a numerical approximation to isotropic wave equations, calculating a numerical approximation to anisotropic wave equations, data compression, cross-correlation for imaging, cross-correlation for gradient computation, calculating propagating source wavefield, calculating propagating receiver wavefield, or substantially simultaneously propagating source wavefield and receiver wavefield.

16. The non-transitory, tangible, computer readable medium of claim 1, wherein the data elements correspond to one or more of wavefield data, image results, and gradient results.

* * * * *